(12) United States Patent
Demsey et al.

(10) Patent No.: US 7,546,607 B2
(45) Date of Patent: Jun. 9, 2009

(54) NATIVE CODE EXPOSING VIRTUAL MACHINE MANAGED OBJECT

(75) Inventors: Seth M. Demsey, Kirkland, WA (US); Tuan Huynh, Seattle, WA (US); Christopher W. Lorton, Bothell, WA (US); Ramasamy Krishnaswamy, Redmond, WA (US); Armin Sadeghi, Bellevue, WA (US); Bruce E. Johnson, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 986 days.

(21) Appl. No.: 10/299,202

(22) Filed: Nov. 19, 2002

(65) Prior Publication Data

US 2004/0098731 A1 May 20, 2004

(51) Int. Cl.
*G06F 9/54* (2006.01)
*G06F 9/46* (2006.01)
(52) U.S. Cl. .......................................... 719/318; 718/1
(58) Field of Classification Search ................. 719/318, 719/328; 718/1
See application file for complete search history.

(56) References Cited

U.S. PATENT DOCUMENTS

| | | | |
|---|---|---|---|
| 6,195,685 B1 * | 2/2001 | Mukherjee et al. | 709/205 |
| 6,675,371 B1 * | 1/2004 | York et al. | 717/114 |
| 6,732,118 B2 * | 5/2004 | Hermann et al. | 707/103 R |
| 6,789,254 B2 * | 9/2004 | Broussard | 717/147 |
| 6,910,215 B1 * | 6/2005 | Diamanti et al. | 719/313 |
| 7,051,288 B2 * | 5/2006 | Bennett et al. | 715/781 |
| 2002/0004815 A1 * | 1/2002 | Muhlestein et al. | 709/201 |
| 2002/0016839 A1 * | 2/2002 | Smith et al. | 709/224 |
| 2002/0173344 A1 * | 11/2002 | Cupps et al. | 455/566 |
| 2002/0180791 A1 * | 12/2002 | Broussard | 345/763 |

OTHER PUBLICATIONS

Hania Gajewska, Mark S. Manasse and Joel McCormack, Why X Is Not Our Ideal Window System. Software—Practice & Experience vol. 20, issue S2 (Oct. 1990).*

* cited by examiner

*Primary Examiner*—Li B Zhen
(74) *Attorney, Agent, or Firm*—Lee & Hayes, PLLC

(57) ABSTRACT

Notifications are generated in managed and native environments and propagated to an interfacing abstraction layer of native code there between. The abstraction layer assesses each received notification to determine whether the notification, or a previously received collection thereof, should be transitioned across a boundary between the managed environment and the native environment. The managed environment includes a virtual machine in a managed code portion. The native environment includes an operating system that interfaces the abstraction layer which is at a boundary between the managed code portion and the operating system. A collection of notifications are those that have been batched and/or synthesized. The abstraction layer is configured with predetermined criteria to assess whether to form a collection of received notifications and/or to prevent a transition of a notification, or collection thereof, across the boundary.

51 Claims, 7 Drawing Sheets

NATIVE CODE EXPOSING VIRTUAL MACHINE MANAGED OBJECT

TECHNICAL FIELD

The present invention relates to virtual machines and operating systems, and more particularly to methods, apparatuses, and computer readable medium for exposing a managed object in a managed code environment of a virtual machine to a native code environment of an operating system.

BACKGROUND

When executing managed code in a virtual machine (VM) environment, a user application program can run on different platforms. In such VM environments, native resources are typically allocated using system calls. These system calls can be made by libraries when executing code in the VM environment. These libraries commonly call through to the native operating system to perform low level functionality such as drawing and windowing management. When these system calls are made, native resources get allocated as an effect of the library call. These native resources must be kept in synchronization with their counterpart in the managed code portion of the VM. When the managed code portion of the VM is through using the native resource, it must then be freed.

Current techniques for exposing user interface (UI) and other libraries with associated underlying resources in a VM environment require a substantial amount of overhead when marshalling the data necessary to create, maintain synchronization, and destroy UI resources such as those that are involved in drawing and windowing management. In many computer-based application programs, a new UI resource is produced each time a new UI resource object is created. Often, developers can inadvertently neglect the effects on the processor speed of producing a large number of UI resources in application programs.

Managing each UI resource generates system calls across a VM/native boundary between the managed code portion and the native code portion. System calls across this VM/native boundary demand considerable processor effort due to the varied code translations that may be necessary for virtual machines to comply with different computer platforms and languages, as well as the considerable amount of data that precisely describes each UI resource. Garbage collection routines that remove managed UI resources also require significant processing since each of many UI resources has to be consciously removed individually, or alternately the UI resources are removed after some prescribed period. If the UI resources are removed after some prescribed period, then there may be a considerable number of UI resources waiting for the duration of the prescribed period to be removed. Storing such a considerable number of UI resources may make such tasks as drawing and windowing management slow in application programs that require corresponding UI resources. Additionally, present computer application programs typically produce multiple concurrently-saved copies of the UI resource. For example, as the UI resource is transferred between the VM, the native environment, and the operating system (OS) itself, a copy of each UI resource object is stored in memory associated with each location.

Application programs that run on such computer environments as stand alone computers, networked computer environments, and computer devices typically inefficiently manage such UI resources, but such inefficiency is typically ignored due to the large processing abilities of these computer environments. Smaller and less powerful, memory constrained and processor constrained devices (i.e. resource constrained devices) such as personal digital assistants (PDAs), cellular telephones, computer devices, embedded devices, microprocessor devices, and microcomputer devices are becoming increasingly popular. Resource constrained devices rely on more limited software, processors, memory, and operating systems than those applied to full size computer environments. Applying a large number of system calls to resource constrained devices commonly makes the devices prohibitively slow to perform many application functions. The code transitions necessary for system calls in resource constrained devices that have been produced between the native code portion and the managed code portion in virtual machines (especially for demanding application programs that require extensive use of UI resources) are so processor intensive that the processor and memory resources become significantly strained. A large amount of calls across the boundary between the managed code executing in the VM environment and the native code executing in the native environment results in undesirable performance characteristics. With respect to these difficult and repetitive calls across the native/managed code boundary that are needed to create and maintain UI resources, it would be an advantage in the art to avoid or reduce the number of calls across the VM/native boundary, particularly in resource constrained systems. Consequently, there is a need for improved methods, apparatuses, and computer readable medium that can provide such a capability.

SUMMARY

In one implementation, a notification generated in a managed environment or in a native environment is collected with others by native code before propagation across a boundary between the managed environment and the native environment. In another implementation a notification is generated in a managed code portion or by an operating system. An abstraction layer, operating in native code at a boundary between the managed code portion and the operating system, scrutinizes, batches and/or synthesizes each notification with prior like notifications before transitioning individual or batched and/or synthesized notifications across the boundary. The abstraction layer is configured to prevent any such transition across the boundary that is unimportant or unnecessary as per predetermined criteria.

BRIEF DESCRIPTION OF THE DRAWINGS

The same numbers are used throughout the drawings to reference like features.

DETAILED DESCRIPTION

Figure 1:
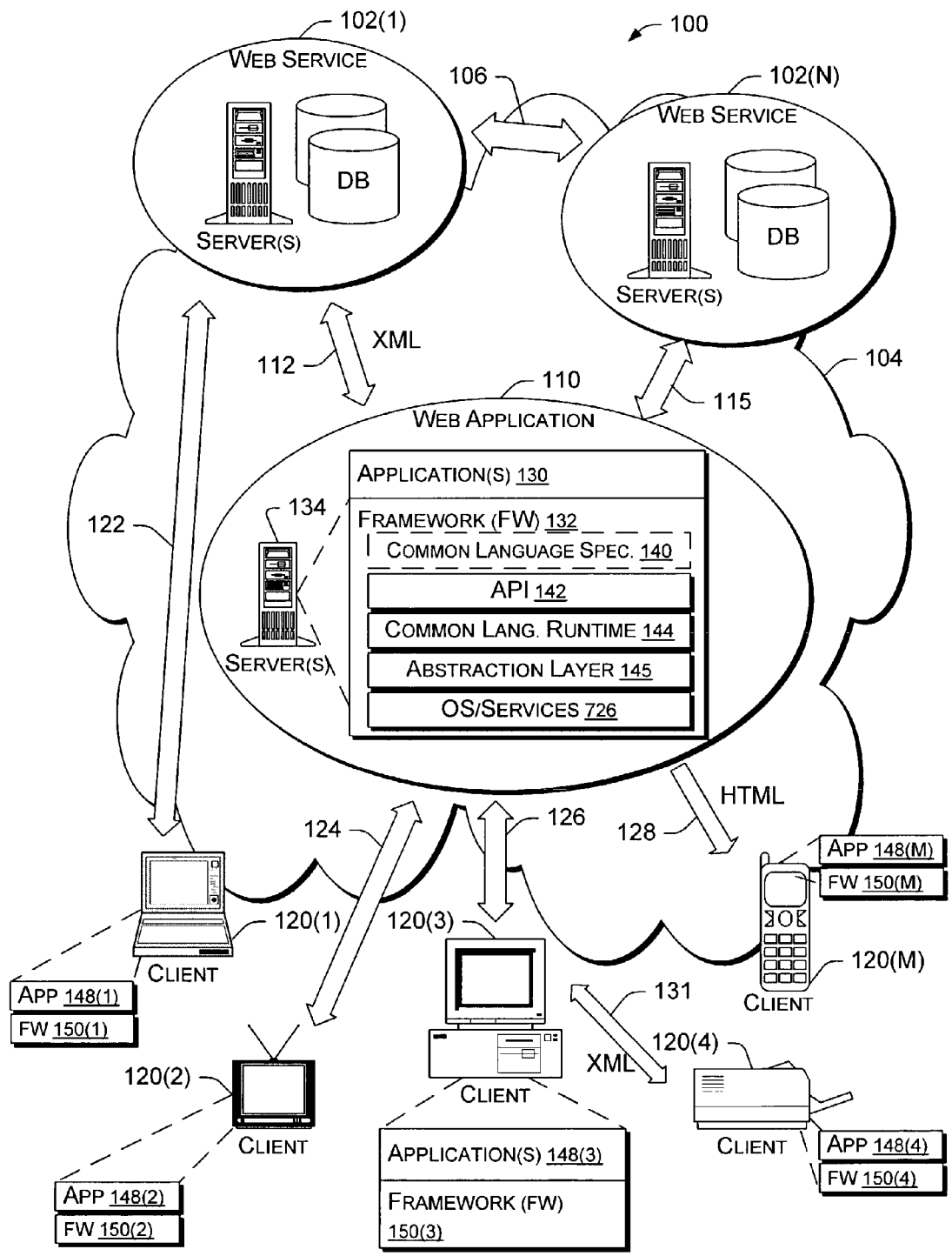
FIG. 1 illustrates a network architecture in which clients having applications and a framework to access Web services over the Internet by using various protocols.

The methods, apparatuses, and computer readable media presented here provide implementations to reduce notifications that are propagated back and forth across a boundary between a virtual machine (VM) and a native operating system (OS). To do so, notifications are scrutinized, batched, and/or synthesized by native code at the boundary. This native code at the boundary is referred to herein as an abstraction layer. The abstraction layer prevents unnecessary notifications from transitioning across the boundary. The abstraction layer also batches and/or synthesizes a notification with prior similar notifications before transitioning the resultant batched and/or synthesized notifications across the boundary. Due to the significant amount of processing that is required with each such transition, it desirable to reduce the number of transitions according to the importance thereof. Such a reduction is accomplished by ignoring unimportant notifications. Further reductions are possible by batching and/or synthesizing multiple notifications of like kind so as to accomplish, in less processing time, the collective goal of the batched and/or synthesized multiple notifications.

Notifications arise in different circumstances in the operating system and related hardware, as well as in the virtual machine. One such notification is an event or a message that relates to a call for a user interface (UI) resource. The event or message can be a call to one or more UI resource libraries, such as for drawing and windowing management. These calls normally cross the boundary between managed code in the virtual machine environment and native code in the environment of the operating system. By creating an abstraction layer (AL) in native code, a mechanism is provided to manage the bulk of the UI resource overhead in native code rather than also supporting UI resource overhead in the managed code. The AL, which is a kind of native application program interface (API), can be configured such that the calls needed to create and maintain UI resources, each of which required extensive processing time and can be quite repetitive, can be done without crossing the boundary between native and managed code. The presence of the AL at the boundary yields desirable results in resource constrained systems as it reduces the number of calls across the VM/native boundary, resulting in increased efficiency and speed.

One type of notification that can be processed by the AL is a message. The message can be pumped from the OS to the AL by use of a message pump or other such message queuing mechanism. The AL will process the message according to predetermined criteria to determine if the message should be forwarded across the VM/native boundary to an application in the VM. Alternatively, the application can call into a library for UI resources, such as a base class library (BCL). The BCL in turn calls with a message into the AL. The AL will process the message from the BCL according to predetermined criteria to determine if the message should be forwarded across the VM/native boundary to the OS via the message pump.

Another type of notification that can be processed by the AL is related to a window of a UI, such as are related to the moving of the window, to colors displayed in the window, to the resizing of the window, etc. The AL can be configured to present a defined set of API to a native windowing environment. By way of example, a status of a window environment can be maintained so that when a notification is received by the AL, the AL can assess whether the notification should be batched or synthesized with prior window-related notifications prior to passing the collected notifications across the VM/native boundary. These notifications are thus handled directly by the AL internally by processing performed by the AL to batch, synthesize and filter out collections of notifications. By way of further example, when a window has coordinates associated therewith (e.g. X, Y), and an application in the VM gives new window coordinates, the AL can serve as an API to assess whether the coordinates have actually changed. The AL can be configured to assess changes to window coordinates so as to optimize calls to the OS by eliminating calls where no actual change has been made to window coordinates. Similarly, the AL can assess calls from the BCL to size, resize, fit and change colors of a window, where these calls do not actually change the window, thereby avoiding one or more computationally expensive calls to the OS for unnecessary redrawing of the window as well as the objects in the window.

Another type of notification that can be processed by the AL is related to input devices such as a pointing device of a user interface. For example, when a mouse is repetitively moved and/or clicked, a keyboard button is pushed, or a touch sensitive screen is touched as user input, a number of notifications (e.g. messages and/or events) can be generated by the OS which are propagated to the AL. Rather than pass each such notification individually across the VM/native boundary, the AL can batch and/or synthesize a plurality of these notifications prior to transitioning the collection thereof across the VM/native boundary to notify the BCL. As such, the traffic of notifications can be reduced by disregarding notifications that are deemed not needed, and by synthesizing multiple notifications into higher level collections of notifications, by predetermined criteria, prior to transitioning the higher level collections of notifications across the VM/native boundary. The AL can be changed, altered, or configured as needed into various configurations to suit the particularities of the VM and/or OS such that transition of notifications across the VM/native boundary are made only in accordance with predetermined criteria, thereby optimizing the transitions as needed.

Another type of notification that can be processed by the AL is related to data storage. If an application in the VM is demanding a plurality of separate data storage operations on a storage medium such as a hard disk drive, the BCL can communicate corresponding respective notifications to the AL. The AL can then batch the notifications until a buffer limit is reached. Then, the AL can transition the higher level batched notifications across the VM/native boundary to the OS to perform a consolidated single data storage operation. By way of example, if a user is operating an application in the VM that writes only one record at a time for a twenty (20) MB picture or database file, the BCL sends repetitive notifications for the same to the AL. The AL then batches the repetitive, like notifications until the last record is written to the AL. The AL then effectively flushes out the collection of repetitively written records by transitioning a higher level batched notification as a single call across the VM/native boundary to the OS to perform a consolidated single data storage operation. This reduces the write operation from 20 iterations to one. Alternatively, the AL can be configured to wait to flush out a storage buffer in a single write operation at a time that is convenient according to predetermined criteria.

Another type of notification that can be processed by the AL is related to networking. By way of example, if an application in the VM is to transmit 100 messages of 10 bytes each across a network, the BLC in the managed code portion can make a respective 100 calls for a socket in hardware to make the 100 transmissions. The AL can be configured to batch the respective 10-byte 100 notifications prior to transitioning a batched notification as a single call across the VM/native boundary to the OS. Alternatively, the transition can take place upon reaching a buffer limit after which the batched notifications are flushed out of native code to the socket of the hardware to perform a corresponding single network transmission, thereby making only a single request across the network. By way of a related example, when an application in the VM is to send a page of text to a network connection, the BCL calls for the creation of a socket in hardware. The application in the VM then sends only one line at a time, starting at the first line and continuing until the last line of the page of text. The AL, as an executing piece of native code, can be configured to receive and batch together repetitive notifications for the transmission of each line of text in the page of text. When a text buffer has a predetermined number of lines of the text to send from the socket to the network connection over the network, the executing piece of native code in the AL transitions a single call across the VM/native boundary to the OS for communication of the text buffer to the socket in the hardware.

Implementations can be made in the general context of computer-executable instructions, such as program modules, being executed by a computer or like device, which, for example, may take the form of a personal computer (PC), a workstation, a portable computer, a server, a plurality of processors, a mainframe computer, etc. Implementations that provide noticeably increased efficiency and speed include those in resource constrained systems such as wireless communications base stations, hand-held communications devices such as cellular telephones, streamed media players, set-top boxes, etc.

Exemplary Network Environment

FIG. 1 shows a network environment 100 in which a network platform, such as the .NET™ platform provided by the Microsoft Corporation of Redmond, Wash., USA, may be implemented. The network environment 100 includes representative Web services 102(1), ..., 102(N), which provide services that can be accessed over a network 104 (e.g., Internet). A Web service can be self-describing and is often defined in terms of formats and ordering of messages.

Web services 102 are accessible directly by other services (as represented by communication link 106) or a software application, such as a Web application 110 (as represented by communication links 112 and 115). Each Web service 102 is illustrated as including one or more servers that execute software to handle requests for particular services. Such services often maintain databases that store information to be served back to requesters. Web services may be configured to perform any one of a variety of different services.

The network environment 100 also includes representative client devices 120(1), 120(2), 120(3), 120(4), ..., 120(M) that utilize the Web services 102 (as represented by communication link 122) and/or the Web application 110 (as represented by communication links 124, 126, and 128). The clients may communicate with one another using standard protocols as well, as represented by an exemplary XML link 131 between clients 120(3) and 120(4).

The client devices, referenced generally as number 120, can be implemented many different ways. Examples of possible client implementations include, without limitation, portable computers, stationary computers, tablet PCs, televisions/set-top boxes, wireless communication devices, personal digital assistants, gaming consoles, printers, photocopiers, and other smart devices.

The Web application 110 is an application designed to run on the network platform and may utilize the Web services 102 when handling and servicing requests from clients 120. The Web application 110 is composed of one or more software applications 130 that run atop a programming framework 132, which are executing on one or more servers 134 or other computer systems. Note that a portion of Web application 110 may actually reside on one or more of clients 120. Alternatively, Web application 110 may coordinate with other software on clients 120 to actually accomplish its tasks.

The programming framework 132 is the structure that supports the applications and services developed by application developers. It permits multi-language development and seamless integration by supporting multiple languages. The framework 132 is a multi-tiered architecture that includes an application program interface (API) layer 142, a common language runtime (CLR) layer 144 (or other VM system), an abstraction layer (AL) 145 in native code, and an operating system/services layer 726. This layered architecture allows updates and modifications to various layers without impacting other portions of the framework 132. A common language specification (CLS) 140 allows designers of various languages to write code that is able to access underlying library functionality.

The framework 132 may also be implemented at the clients. Clients 120(1–M) each represent the situation where a framework 150 is implemented at the client. This framework 150 may be identical to server-based framework 132, or modified for client purposes as may be desirable in smaller and less powerful, memory constrained and processor constrained devices (i.e. resource constrained devices). Alternatively, the client-based framework 150 may be condensed in the event that the client is a limited or dedicated function device, such as a cellular phone, personal digital assistant, handheld computer, or other communication/computing device.

The API layer 142 presents groups of functions that the applications 130 can call to access the UI resources and services provided by layer 726 by interfacing with AL 145. Calls from API layer 142 placed by remote applications can be supported by configuration of the framework 132. Representative applications 148(1–M) residing on clients 120(1–M) can use the API functions by making calls directly, or indirectly, to the API layer 142 over the network 104. Each representative application 148 can be run in a virtual machine environment in a managed code portion. One such virtual machine environment is the re-architected Compact Network Framework™ which is provided by the Microsoft Corporation of Redmond, Wash., USA. The Compact Network Framework™ can run on resource constrained devices using an intermediate level code. It is beneficial that the Compact Network Framework can run on any processor or with any operating system.

Developers' Programming Framework

Figure 2:
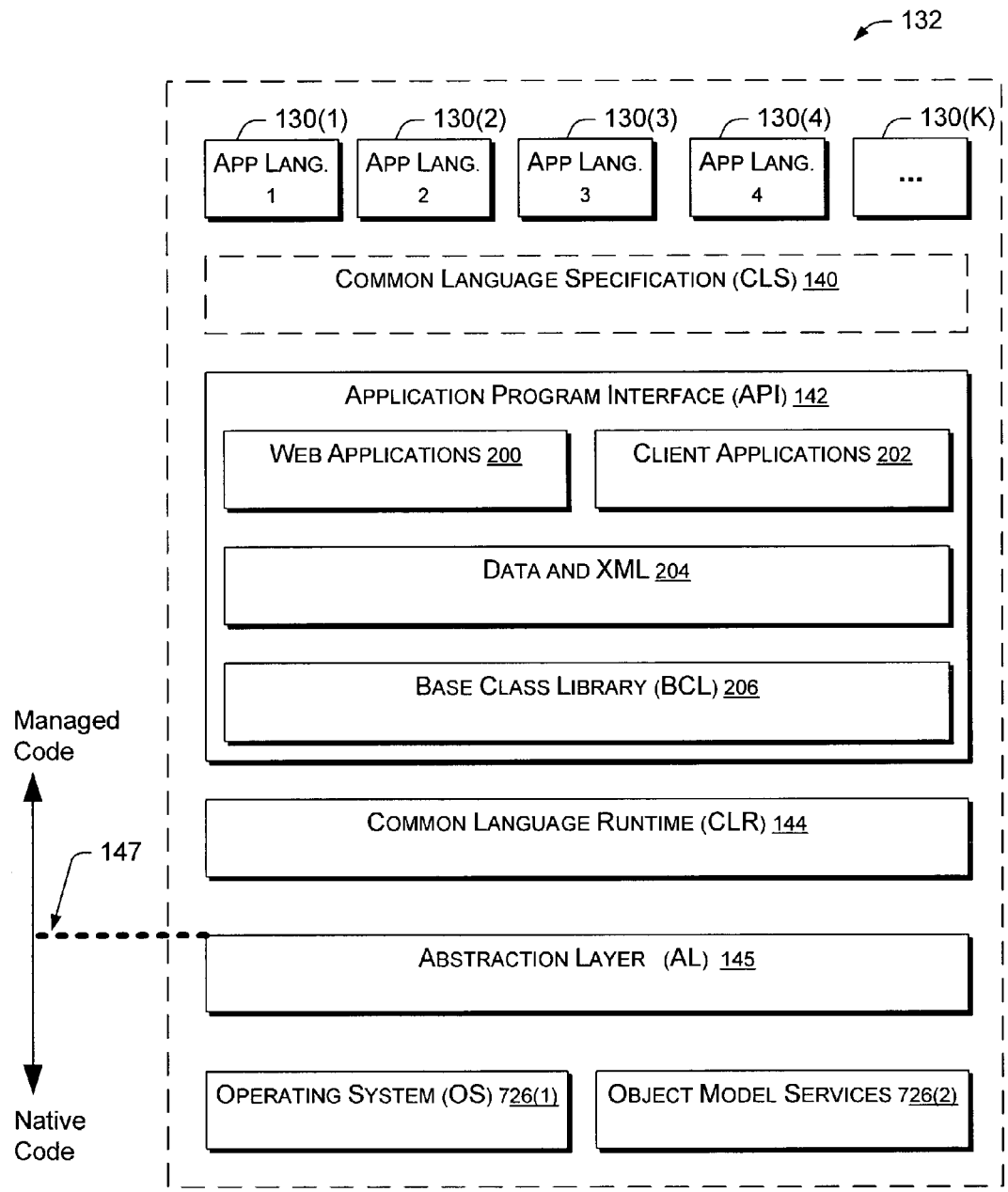
FIG. 2 is a block diagram of a software architecture for the framework of FIG. 1 including a virtual machine for executing managed code, the framework including an application program interface (API) stacked above a common language runtime (CLR), the software architecture also including native code executing in a native environment that includes an abstraction layer (AL) interfacing the managed code portion and an operating system in the native code portion.

FIG. 2 shows the programming framework 132 in more detail, which may also be understood as a condensed implementation of client-based framework 150. The common language specification (CLS) layer 140 supports applications written in a variety of languages 130(1), 130(2), 130(3), 130(4), ..., 130(K). The CLS 140 specifies a subset of features or rules about features that, if followed, allow the various languages to communicate. The CLR 144 allows seamless multi-language development, with cross language inheritance, and provides a robust and secure execution environment for the multiple programming languages.

The framework 132 includes both native and management code portions having a boundary 147 there between. Encapsulated in framework 132 is the abstraction layer (AL) 145 that is in the native code portion. AL 145 interfaces both the managed code portion and the native code portion of the operating system 726(1) (e.g., Windows®-brand operating systems) and the object model services 726(2) (e.g., Component Object Model (COM) or Distributed COM). The operating system 726(1) provides conventional functions, such as file management, notification, event handling, user interfaces (e.g., windowing, menus, dialogs, etc.), security, authentication, verification, processes and threads, memory management, and so on. The object model services 726(2) provide interfacing with other objects to perform various tasks. Calls to system resource libraries (e.g. UI resource libraries) made to the API layer 142 are handed to the CLR 144. These calls to system resource libraries are communicated from the CLR 144 to AL 145. AL 145 selectively processes the calls and then selectively passes some of the calls, based upon predetermined criteria, for local execution by the operating system 726(1) and/or object model services 726(2). The predetermined criteria for the selective passing of the calls can be implemented with due consideration for the capabilities of resource constrained clients. The predetermined criteria can be implemented to reduce calls across boundary 147, such as for drawing and windowing management, by providing the bulk of system resource management overhead in native code of AL 145 and thereby realize increases in efficiency and speed.

The framework 132 may be described in the general context of computer-executable instructions, such as program modules, being executed by one or more computers or other devices. Generally, program modules include routines, programs, objects, components, data structures, etc. that perform particular tasks or implement particular abstract data types. The framework 132 may also be practiced in distributed computing environments where tasks are performed by remote processing devices that are linked through a communications network. In a distributed computing environment, program modules may be located in both local and remote computer storage media including memory storage devices.

The API 142 groups API functions into multiple namespaces. In the exemplary implementation, the API 142 is organized into four root namespaces: a first namespace 200 for Web applications, a second namespace 202 for client applications, a third namespace 204 for data and XML, and a fourth namespace 206 for base class libraries (BCLs). The Web applications namespace 200 pertains to Web based functionality, such as dynamically generated Web pages (e.g., the Active Server Pages (ASP) available from Microsoft Corporation of Redmond, Wash., USA). It supplies types that enable browser/server communication. The client applications namespace 202 pertains to drawing and client side UI functionality. It supplies types that enable drawing of two-dimensional (2D), imaging, and printing, as well as the ability to construct window forms, menus, boxes, and so on. The data and XML namespace 204 relates to connectivity to data sources and XML functionality. It supplies classes, interfaces, delegates, and enumerations that enable security, specify data types, and serialize objects into XML format documents or streams. The base class libraries (BCL) namespace 206 pertains to basic system and runtime functionality. It contains the fundamental types and base classes that define commonly-used value and reference data types, events and event handlers, interfaces, attributes, and processing exceptions. The CLR 144 executes managed code within the environment of the BCL namespace 206.

Figure 3:
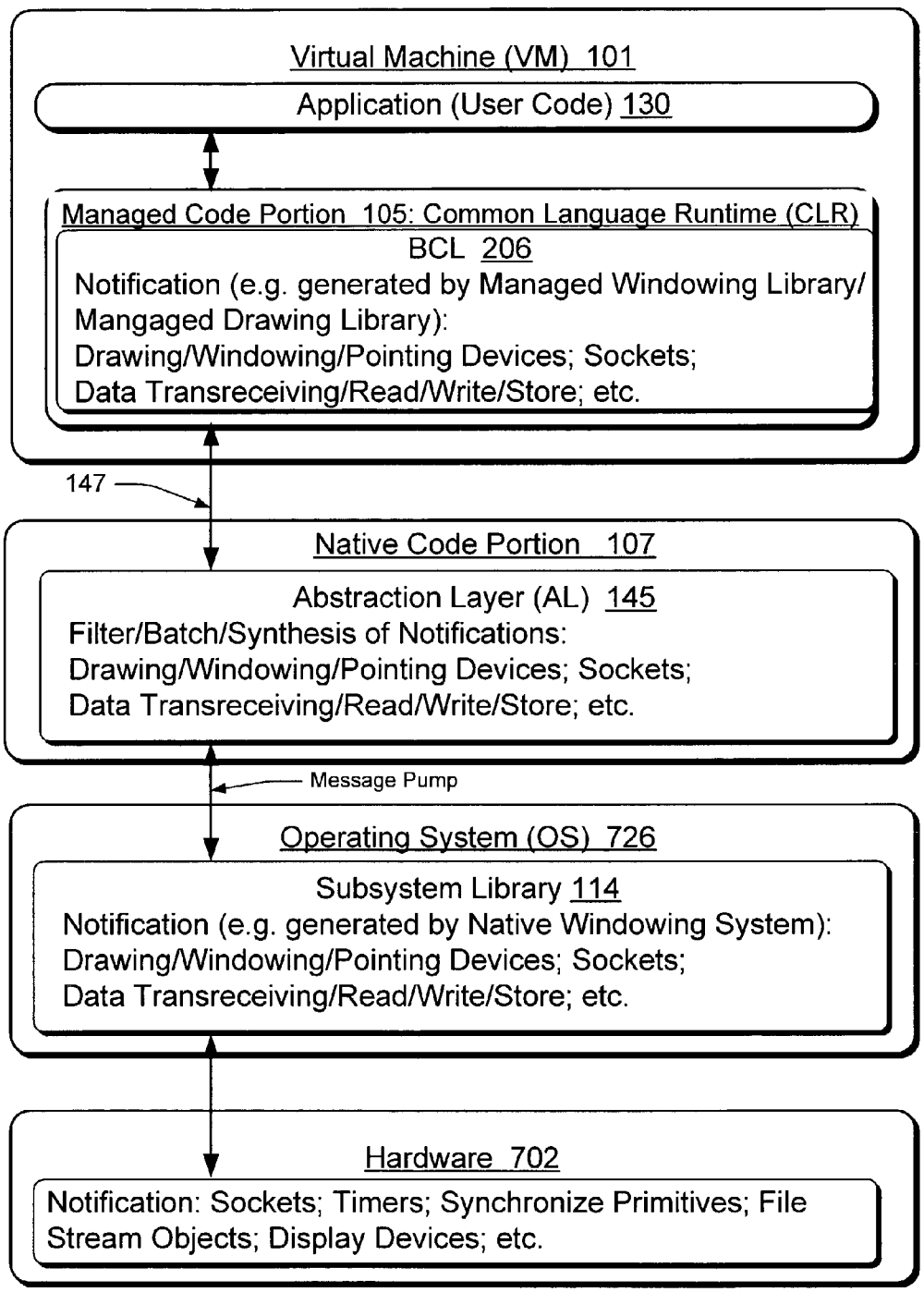
FIG. 3 illustrates one embodiment of a computer environment integrating a virtual machine, the computer environment including a native code portion and a managed code portion.

One implementation in which notifications can be managed is described relative to FIG. 3. Notifications can arise, for example, when calls are made using a component of a library such as a call made by a library component that requests one or more UI resources. Examples of uses of libraries for UI resources are given in this disclosure by way of example and not by way of limitation. Exemplary implementations of UI resource management are given in the context of windowing management and in the context of drawing management. In this disclosure, the term "drawing" refers to programs and processes (e.g., software and/or firmware) such as drafting, font, painting, graphics, etc. that allow users to generate and/or manipulate displayed objects via calls to UI resource libraries.

The FIG. 3 implementation shows a computer environment 300 utilizing a virtual machine (VM) 101 having an architecture to run on different platforms (i.e., interface having different operating systems and different application programs). The VM 101 can be in a network framework as was described with respect to FIGS. 1-2, such Java or the .NET computer software produced and distributed by Microsoft Corporation of Redmond, Wash., USA. Computer environment 300 includes VM 101. The computer environment 300 of FIG. 3 includes an application program 130, a managed code portion 105, a native code portion 107, an operating system (OS) 726, and hardware 702. In one embodiment, the AL 145, which forms part of native portion 107, stores data from the system calls that are associated with one or more varied UI resources, such as drawing resources. The user interface (UI) of the VM 101 can be small, where the performance is directed as to user input and how the user input is displayed as information on the UI, such as a touch sensitive screen. The goals of the VM 101 include enhancing the size, performance, and flexibility of the programs directed to system resources, such as UI resources (e.g. drawing programs).

Though the concepts described here are applicable to all computer environments as depicted in FIG. 3, in general including laptops, personal computers, networks, mainframes, etc.; they are especially beneficial to such resource constrained devices (that have a relatively small processor and/or memory) as personal digital assistants (PDAs), cellular telephones, computer devices, embedded devices, microprocessor devices, and microcomputer devices. To provide some scale, such resource constrained devices are less than $\frac{1}{20}^{th}$ of size of many desktop or laptop computers (and often less than $\frac{1}{60}^{th}$). The relatively small size, and somewhat simplified operation, of the resource constrained devices dictate that the designers program effectively and in a manner that complies with platform guidelines.

The managed code portion 105 and the native code portion 107 contribute to a managed execution process for the programs controlling UI resources, such as drawing programs. The native code portion 107 includes AL 145 that sits directly on the OS 726. AL 145 communicates using the native code language of the OS. Therefore, the native code portion 107 compiles for the OS 726 directly. As such, the native code portion 107 codes in such native computer languages as C, C++, Basic, etc. which the OS can handle. The native code portion 107 contains such features, for example, as a just in time (JIT) compiler, a class loader, a garbage collector, an execution environment, and/or an interpreter.

The managed code portion 105 interfaces the AL 145 of the native code portion 107, is in the language of the user application program 130 and the intermediate language, and contains a variety of class libraries that are utilized by the application program such as 200-204 seen in FIG. 2. Another example of a class library that is included in the managed code portion 105 is BCL 206. In an implementation, the BCL 206 can include a graphic user interface (GUI) code library. The GUI code library can be coded in byte code language which is an intermediate language between the language of the application program 130 and that of the native code portion 107. BCL 206 largely determines the characteristics of the interaction between the user and the computer environment 300, and also determines the types of experience that the user will have when using any particular application program 130.

In another implementation, the BCL 206 is in a system where BCL 206 can include a managed library. The managed library can receive and send messages respectively to and from AL 145. The managed library can also receive and send messages respectively to and from application 130. The managed library can be more than one library and can include a managed drawing library and a managed windowing library. Each of the managed drawing library and the managed windowing library can receive and send messages respectively to and from AL 145. Each of the managed drawing library and the managed windowing library can also receive and send messages respectively to and from application 130.

Often, software developers wish to allow users to have access to UI resources to make the software useful and practical. One such access to a collection of UI resources involves user interface (UI) libraries that give users the ability to draw objects, bar charts, figures, etc. using drawing resources. In drawing programs, drawing resources draw using drawing primitives such as lines, rectangles, etc. Drawing resources such as pens or brushes each have drawing parameters that may include one or more of color, weight, style, and gradient. The drawing resource parameters relating to text include, for example, color, font, size, and style. The UI libraries are found in the BCL 206 and commonly call code using system codes from managed code portion 105 through to the native code portion 107 to the operating system. Such system codes can be used to perform relatively low level functionality as drawing and windowing management.

The identity of certain VMs 101 is evident from the output. For example, when a Java applet runs, a skilled user or developer can positively identify it as a Java applet. Other embodiments of VMs, by comparison, are seamless and consistent with the native device application program. A pocket PC application running on the same VM 101 therefore looks and feels differently from a smart phone application or an embedded controller application. As such, the appearance and characteristics of each application program that runs on each respective OS 726 is primarily determined by the developer of that particular application program, and not the particular VM. Each application program looks and feels like the application program as developed by the developer for the OS 726.

The application or application program 130 is typically programmed by a code developer to provide the functionality of the computer environment 300. The developer typically programs the code for the application program, and has the program compiled, loaded, and linked to create the executable file (.exe) for the application program. The .exe file is executed by the user of the computer environment 300 to run the application program, and therefore causes the application program to perform as desired by the user.

As illustrated in FIG. 3, the BCL 206 containing the UI libraries are within and associated with the managed code portion 105. BCL 206 contains libraries for the generation of notifications. Such notifications can be for events and/or messaging related to system resources. These system resources include UI resources for drawing and windowing management and for pointing devices such as mouses, cursor controllers, joy sticks, keyboards, etc. These system resources also include resources for managing sockets for networking, data transmission and receiving, and data reading, writing, and storage. Similar capabilities for handling notifications, including the handling of events and/or messaging for UI resources, are seen in FIG. 3 in a subsystem library 114 of OS 726. AL 145 serves as a native API to the BCL 206 in the managed code portion 107 and also to the subsystem library 114 in the OS 726. The subsystem library 114 in the OS 726 can include a native windowing system in the native code. The native windowing system can send and received messages, via a message pump, respectively to and from AL 145. The message pump is represented in FIG. 3 the double arrow line from AL 145 to subsystem library 114. When the message pump sends a message from AL 145 to the native windowing system, a UI control for a UI resource can be created, managed, and/or destroyed (e.g. closing a window displayed in a UI). When the message pump sends a message from the native windowing system to AL 145, the results of the native windowing system operation are communicated to the AL 145. When the results are received, the AL 145, by predetermined criteria, will propagate only those messages and/or results received from the native windowing system that are the minimal necessary to support a UI control being used with respect to the native windowing system.

The AL 145 is contained within and associated with the native code portion 107. System parameter calls are generated by the application program 130 (e.g., by user input or program libraries). These system parameter calls, which represent notifications of events and messaging related to UI resources, are transmitted through the BCL 206 (e.g. a GUI library) of the managed code portion 105 to the AL 145 of the native code portion 107. AL 145 performs an assessment, based upon predetermined criteria, as to whether a notification associated with each system call should pass over the boundary 147 between managed code and native code. To perform this assessment, the AL 145 can be configured to utilize previously stored or cached information. This information can be related to the status of each effected system resource. Some notifications, including events and/or messaging, are not important enough to be passed across boundary 147, where the importance may be a function of whether the computer environment is a resource constrained device. For instance, if a user is operating a hand-held PDA by use of a pointing device on touch sensitive screen of the PDA, each movement of the pointing device on the screen may generate a notification, including events and/or messaging, that are not important enough to be passed across boundary 147. The assessment of the importance can be configured to be low if the latency or system response time for each unnecessary notification is intolerable to the user. Accordingly, the predetermined assessment criteria in AL 145 will batch and/or synthesize some notifications prior to crossing boundary 147, and will filter out or otherwise ignore some notifications, including events and/or messaging. By batching, synthesizing, and filtering out notifications, including events and/or messaging that are associated with calls for UI resources, the computing system can be made to be both faster and more efficient.

If the assessment in AL 145 of a notification associated with a system call for a system resource is favorable based upon the predetermined criteria, the notification, a batched set of notifications, and/or a synthesized set of notifications are passed from AL 145 to OS 726. OS 726 includes subsystem library 114 as a layer in OS 726. Similarly, certain notifications (e.g. system calls) can be generated by hardware 702, such as by sockets, timers, synchronized primitives, file stream objects, display devices, etc. as shown in FIG. 3. These notifications are passed from hardware 702 to OS 726. Similarly, notifications (e.g. system calls or system parameter calls) can be generated by the OS 726, such as can be associated with one or more libraries of subsystem library 114 with respect to system resources such as UI resources. These notifications can be transmitted through the subsystem library 114 to the AGL 145 in the native code portion 107, and then to BCL 206 (e.g. a GUI library) in of the managed code portion 105, and finally to the application program 130. Again, the predetermined assessment criteria in AL 145 will coordinate a batching and/or synthesis of some notifications prior to crossing boundary 147. This assessment may direct that some of the notifications not be batched or synthesized prior to crossing boundary 147, but rather be immediately transitioned across boundary 147. This assessment may also direct that certain notifications be filtered out or otherwise ignored. By batching, synthesizing, and filtering out notifications, including events and/or messaging, generated by hardware 702 and/or subsystem library 114 in OS 726 prior to crossing from native code to managed code at boundary 147, the computing system can be made both faster and more efficient.

Greater interoperability between networked computer devices and/or environments as seen in FIG. 3 enhances the user's and developer's experience of programs calling for system resources, such as UI resources including drawing programs, and increase the acceptance of such programs that run on stand-alone computers and on such networks as the Internet, intranets, local area networks (LAN), and wide area networks (WAN). The computer environment 300 generally allows for such interoperability for many different networked computer devices such as personal computers, telephones, workstations, PDAs, embedded controller devices, etc. that have different operating systems and do not necessarily communicate or interface well. Additionally, the computer environment 300 effectively displays data originating from different programs, such as drawing programs, which run on the same, or different, computers. As such, much of the data prepared by one application program or operating system and then processed and/or stored by many network servers can be considered "images" which should be able to be effectively used by another application program or OS.

Implementations described and illustrated in this disclosure are intended to streamline the computer processing, and therefore provide efficiency in the allocation and management of system resources, including but not limited to UI resources related to OS resources. Some such implementations are especially suited to resource constrained devices. Even with the more powerful computers, though, it would still be desirable to follow good programming techniques to reduce the number of transitions across native/managed code environments of the more powerful computers (e.g. system calls by the use of system parameter calls) to accomplish faster and more reliable application programs, thereby increasing the user's enjoyment and use of such application programs. Such reduction of the number of system parameter calls across the VM/native boundary 147 within any computer environment is within the intended scope of the present invention. Implementations of a managed execution process that is performed by the managed code portion 105 and the native code portion 107 as shown in FIGS. 2-3 follows these guidelines:

A. Choose a compiler to associate with the application program 130. To obtain the benefits provided by the CLR 144, a developer can select one or more language compilers that target the runtime.

B. Compile the code to an intermediate language code (e.g. the "MSIL" of the Microsoft Corporation intermediate language for .NET). This compiling translates the source code, XML, or other application program into the intermediate language, and also generates associated metadata. The intermediate language is a CPU-independent set of instructions that can be efficiently converted to the native code to ease the transition of data by way of a notification across the VM/native boundary 147 between the managed code portion 105 and the native code portion 107. The intermediate language includes instructions for loading, storing, initializing, and calling methods on objects, as well as instructions for arithmetic and logical operations, control flow, direct memory access, exception handling, and other operations. The metadata describes such parameters as the types in the code, including the definition of each type, the signatures of each type's members, the members that the code references, and the data that the runtime uses at execution time.

C. Compile the intermediate level code into native code. The native code portion 107 creates a native system resource from a managed assembly and installs it into the native code portion 107 on the local computer. A native system resource that is a file containing compiled processor-specific machine code is produced. Logical representations of the system resources can be stored or cached in the AL 145 of the native code portion 107. The actual system resource resides in the OS 726. In different embodiments, the storage or cache can be a physically distinct memory device that is set aside to store and retrieve system resources. Alternatively, the native code portion of the storage can be a portion of random access memory (RAM) contained in the computer environment 300 or in a memory 716 the computer environment 702, as described herein, that is typically used to store and/or retrieve other data.

In implementations of VM 101, at execution time, a just-in-time (JIT) compiler associated with the VM 101 in the native code portion 107 translates the intermediate language into the native code. During this compilation, the code passes a verification process that examines the intermediate language code and metadata to find out whether the code can be determined to be type safe. Before the intermediate language can be executed, it must be converted by the JIT compiler of the VM 101 to the native code. The native code is a CPU-specific code that runs on the same computer architecture as the JIT compiler of the VM 101. Developers can write a set of instructions for the intermediate level language that can be JIT-compiled and executed on computers with different architectures. The managed code will run only on a specific operating system if it calls platform-specific, native APIs, or a platform-specific class library.

D. Execute the code. The CLR 144 provides the infrastructure that enables the code execution (as well as a variety of services that can be used during execution) to take place. During execution, the OS UI resources are displayed on the UI (e.g. a touch sensitive screen) which can respond to user input. As such, user input with a pointing device of the computer environment 300 is mirrored by motion of the OS UI resource across the UI. Before a process can be executed by the computer environment 300, it must be compiled to processor-specific code. Each process for which the intermediate language has been generated is JIT-compiled when it is called with a system parameter call for the first time, and then executed. The next time the process is executed, the existing JIT-compiled native code is executed. The process of JIT-compiling and then executing the code is repeated until execution is complete.

E. During execution, managed code receives services such as automatic memory management, security, interoperability with unmanaged code, cross-language debugging support, and enhanced deployment and versioning support. After a native draw resource is generated for an assembly program, the runtime automatically attempts to locate and use this native image each time it runs the assembly. If it is unable to find a suitable native image, the runtime reverts to a standard compiled program.

In a network environment, including the computing environment seen in FIG. 3 and the remote computer 748 as described later relative to FIG. 7, each one of the plurality of computers that form the computer environment 300 may be running different application programs and operating systems, and may have different capabilities and purposes. The VM 101 has the capability of interfacing with a plurality of computers simultaneously to affect such networked activities as parallel processing with what appears to the user of the VM 101 as a non-networked computer environment. A challenge in creating an operating networked environment is to configure different computers having different operating systems to permit effective communication and data usage. Such a challenge is met by the exemplary implementation seen in FIG. 4 wherein a plurality of networked computers are arranged within virtual machine 402. The implementation of virtual machine 402 combines multiple computer environments having the same or different operating systems (e.g., Microsoft® Windows®, Unix, and Apple OS) to function as a single computer environment. Also, eXtensible Markup Language (XML) is a computer language that permits one application program to utilize and/or modify the data produced by another application program. XML is an open industry standard managed by the World Wide Web Consortium. The virtual machine 402 includes a first computer 120($i$) having a first OS 726, and a second computer 120($i$+1) with a second OS 726. The first computer 120($i$) may be remote from the second computer 120($i$+1), necessitating the user of a network to provide data communications. A user can access the virtual machine 402 in a similar manner as a user would interface with the computing environment seen in FIG. 3 or a remote computer 748 as seen in FIG. 7.

Virtual machine 402 most interacts with the native OS in the client-server configuration within the network environment when, for example, the first OS 726 associated with first computer 120($i$) is interfacing with the second OS 726 associated with a second computer 120($i$+1). Where there are a variety of different native OS, it is desirable that each VM/native boundary 147 in between the virtual machine 402 be interfaced with an abstraction layer in native code. The VM/native boundaries 147 of respective computers 120($i$), 120($i$+1) can be configured in an operating system such as JAVA or in the .NET computer software produced and distributed by Microsoft Corporation of Redmond, Wash., USA.

Figure 7:
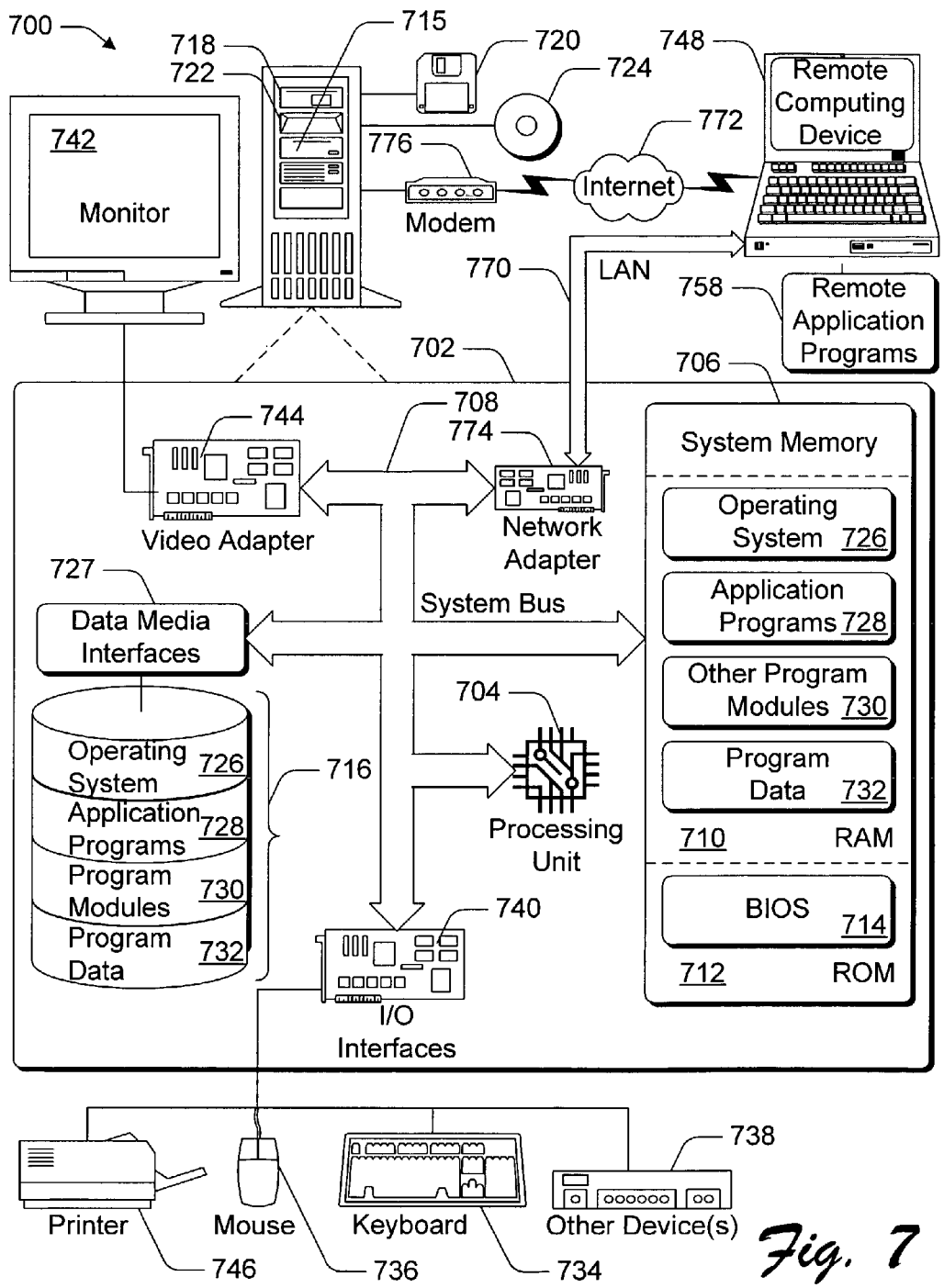
FIG. 7 illustrates a block diagram of the components of an exemplary computer associated with one embodiment of a computer environment shown in FIGS. 1-2 that may execute all or part of the software architecture of FIG. 2.

Referring now to FIGS. 3 and 7, the VM 101 can be considered to be an operating system that runs a system resource, such a UI resource including a drawing resource (e.g., a computer pen, a computer paintbrush) within the managed code portion 105 to create a drawn portion. The computer environment 300 of FIG. 3 and the computer environment 700 shown in FIG. 7 can implemented such that the drawing resource can be controlled by a UI to the VM 101 in the managed code portion 105. Data corresponding to the drawing resource can be stored in one implementation of the AL 145, such as in virtual cache memory. This stored data can be configured such that the user of the VM 101 has access to the drawing resource using system parameter calls having limited system latency compared to system calls between the VM 101 and the native OS 726 of both the computers 120($i$) and 120($i$+1).

When executing code in the native code portion 107 (i.e., the VM environment), the UI resource libraries use the system parameter calls to perform low level functionality such as drawing and windowing management. In such systems, UI resources for both drawing and windowing management within the native code portion 107 are allocated based on one or more UI resource library system parameter calls. When the VM-managed code is finished with the UI resource, the UI resource is then freed.

In one general aspect, it would be desirable to store the codes (i.e., of the system parameter calls) of UI resources that are transmitted to the native code portion 107 in a VM managed memory included in the managed code portion 105. The codes representing the UI resources can be stored as native code in the native code portion 107, such as in a cache memory situated in AL 145. When the codes of UI resources are stored in AL 145, an assessment of notifications received by AL 145 can be made at AL 145 based upon predetermined criteria as to whether to cross the boundary 147. The codes representing the UI resources that give rise to notifications will cause the AL 145 to perform batching, synthesizing, and/or filtering out of the notifications based upon the predetermined criteria. The criteria can be used to achieve speed and efficiency by reducing calls across the boundary 147.

In one aspect, it would be desirable to store the codes (i.e., of the system parameter calls) of drawing resources that are transmitted to the native code portion 107 in a VM managed memory included in the managed code portion 105, such as in a cache memory situated in AL 145. The code representing the drawing resources can be stored in AL 145 as native code in the native code portion 107. A computer language such as XML can be used to store the drawing resources in the managed code portion 105. XML is desirable because it allows different application programs to display, organize, program, edit, and transfer data relating to drawing resources between different web devices and application programs while maintaining the ability to maintain the data characteristics.

XML separates the underlying data from the manner in which the data is displayed (and which may be controlled by the user). The data relating to the drawing resources may be accessed and "unlocked" by each web device so that the underlying program may be displayed, organized, programmed, edited, and transferred between web devices. Additionally, the web device that access the data can format to display the underlying data as desired.

Figure 5:
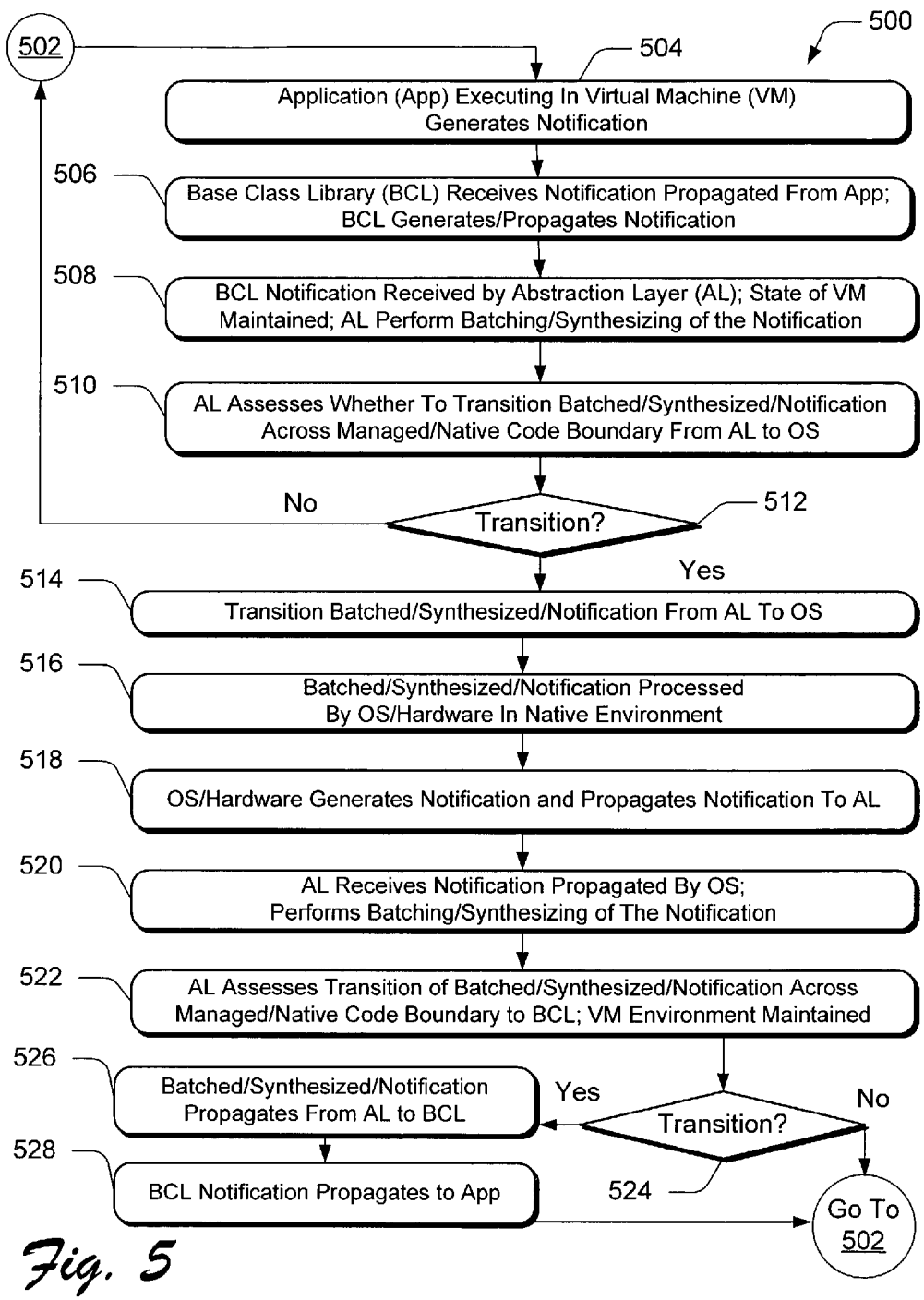
FIG. 5 illustrates a flow chart of one implementation of a method that may be performed on the framework shown in FIGS. 1-2.

A method 500 seen in FIG. 5, as read in conjunction with implementations of the AL 145 shown in FIGS. 1-3, provides implementations for efficiently managing the transition of notifications, such as calls for system resources, across a VM/native boundary between a managed code portion and a native code portion. This efficiency reduces processor efforts in code translations for virtual machines to comply with computer platforms and languages.

Method 500 begins at initial block 502 where control is passed to block 504. At block 504, an application (APP) executing in a Virtual Machine generates a notification, such as may be associated with a call for a User Interface (UI) resource. This notification is propagated from the application at block 506 to a base class library (BCL) executing in common language runtime (CLR) in the VM. The BCL generates a notification (e.g. events and/or messaging (E/M) that may be associated with a call for one or more UI resources) that is propagated to an Abstraction Layer (AL). The AL is in native code of the native environment of an operating system (OS). At block 508, the AL receives the notification (e.g. E/M).

The state, status, or condition of the VM and any associated system resources can be maintained or updated at block 508. The maintenance or update can be in whole or partially based upon the notification received by the AL. These statuses, and any updates thereto, can be stored or cached at the AL, such in virtual memory.

Each notification received by the AL can be combined with previously received notifications to form a batched or synthesized collection of like notifications. Alternatively, a notification can be ignored by the AL or immediately transitioned to the OS. The processing of notifications by the AL occurs at block 510 based upon predetermined criteria. The predetermined criteria used at block 510 is an assessment that can take into consideration the status of the VM, and optionally of one or more UI resources. The assessment determines whether the notification, of a batched/synthesized collection of notifications, (e.g. E/M associated with one or more calls for the UI resources) should be transitioned across a boundary that exists between the managed code of the virtual machine environment and the native code of the native environment.

To perform this assessment, the AL 145 can utilize previously stored or cached information with respect to the statuses of the VM and/or of effected system resources. Notifications (e.g. E/M) that are deemed by the criteria not to be important enough to be immediately transitioned through the managed/native code boundary are batched and/or synthesized for a subsequent composite or group transition over the boundary. Events and/or messaging that are deemed by the criteria not to be important in any significant respect are ignored. When the computer environment is a resource constrained device, the criteria for transitioning events and/or messaging across the managed/native code boundary with respect to a call for a system resource can be used to achieve speed and efficiency of the computer environment.

After the predetermined criteria is assessed at block 510, a decision block 512 passes control of method 500 back to block 502 when the notification (e.g. E/M associated with the call for one or more UI resources) is batched, synthesized, and/or ignored. Otherwise, at block 514, a transition is made across the managed/native code boundary of synthesized/batched notifications or of an individual notification. After transition is made at block 514, that which is transitioned over the boundary is received and processed by the OS in the native environment at block 516. At block 518, the OS (e.g. a subsystem library thereof) may generate one or more notifications. These notifications (e.g. E/M) are passed from the OS and received at block 520 by the AL. Again, batching, synthesizing, and/or ignoring of the notifications are performed by the AL. Notifications that are deemed by the criteria not to be important enough to be immediately transitioned through the managed/native code boundary are batched and/or synthesized for a subsequent composite or group transition over the boundary. Events and/or messaging that are deemed by the criteria not to be important in any significant respect are ignored.

After block 530, method 500 moves to block 522 where an assessment of one or more notifications received at the AL from the OS occurs. The assessment that is performed at block 522 is based upon predetermined criteria. This criteria determines whether the one or more notifications received at the AL from the OS should be transitioned (e.g. passed) over the boundary between the managed code of the virtual machine environment and the native code of the native environment. To perform this assessment, the AL can be configured to utilize previously stored or cached information with respect to the statuses of the VM and/or of effected system resources.

After the predetermined criteria is assessed at block 522, a decision block 524 passes control of method 500 back to block 502 when the one of more previously received notifications generated by the OS are batched, synthesized, and/or ignored. Otherwise, at block 526, a transition is made across the managed/native code boundary of batched, synthesized, and/or unbatched notifications that were generated by the OS (e.g. a subsystem library thereof). Thus, at block 526, the batched, synthesized, and/or unbatched notifications generated by the OS are received by the BCL in the managed code portion with the VM. These batched, synthesized, and/or unbatched notifications are passed at block 528 from the BCL executing in CLR in the VM to the application (App) in the managed code environment. Method 500 then passes control back to block 502 for potential repetitions of blocks 502-528.

Figure 4:
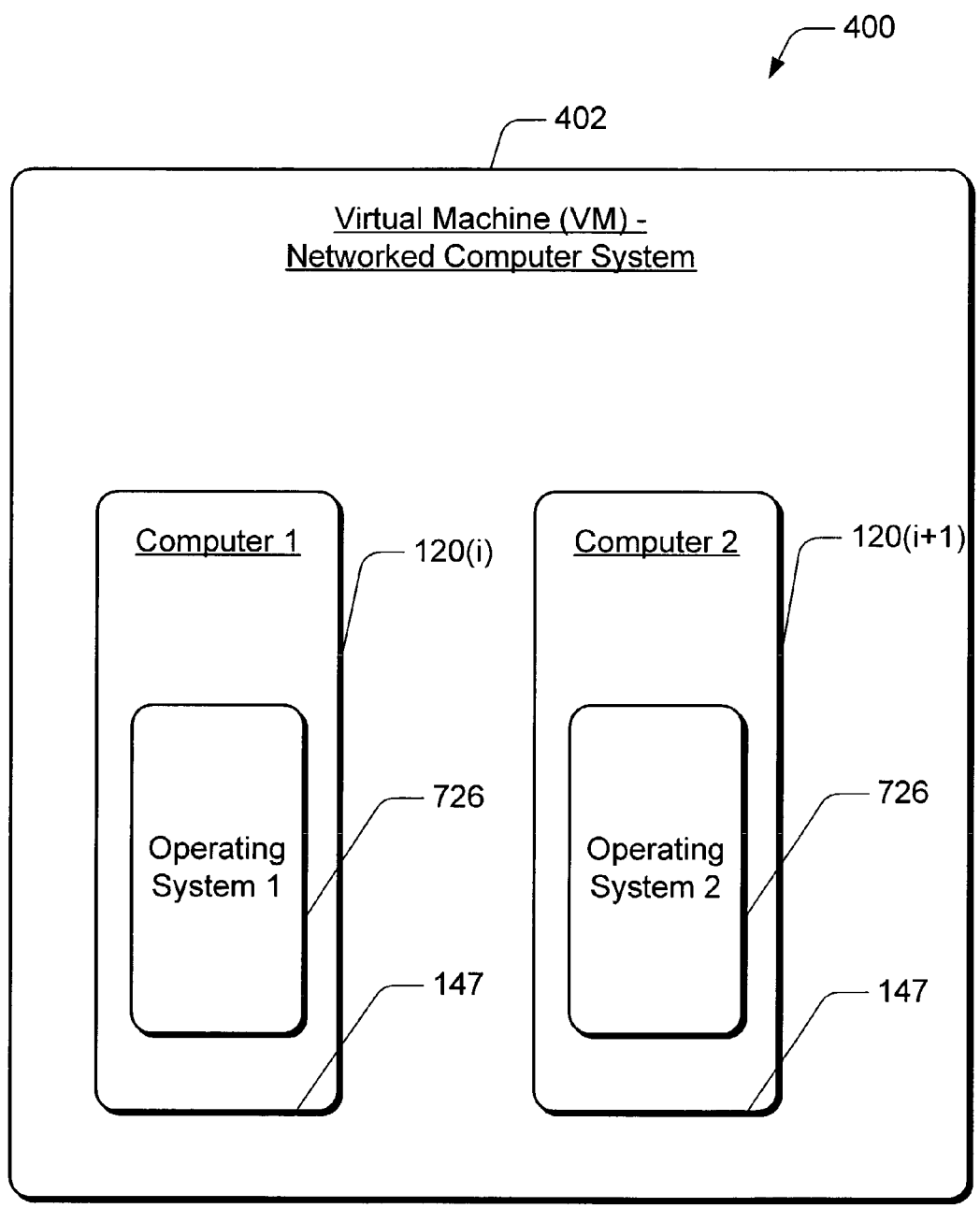
FIG. 4 illustrates one embodiment of a plurality of networked computers arranged within a virtual machine configuration.

Referring now to FIGS. 2-4, and considering that in complex application programs, such as drawing programs (e.g. CAD/CAM), where many users create hundreds, or even thousands, of calls for UI resources, a reduction in the number of system calls can significantly diminish the number of code transitions across the VM/native boundary 147 between the managed code portion 105 to the native code portion 107. This diminution in the number of code transitions often reduces the processor load and improves the user's experience or the designer's expectations with the drawing programs, especially in resource constrained devices. The storage (i.e., caching) of the status of UI resources and/or the VM 101 in the AL 145 contained in the native code portion 107, and/or in the OS 726, can be configured to best assist the criteria assessed by AL 145 with respect to the batching, synthesized, filtering out, and/or ignoring of notifications. This storage of statuses, and comparison of the same in the predetermined assessment criteria at AL 145, helps to limit the amount of data transmitted between the managed code portion 105 and the native code portion 107. Caching the status of UI resources and/or the VM 101 within the AL 145, and/or in the OS 726, in the native code portion 107 reduces the number of native resources that must be accessed from remote locations (e.g., from a server) during the course of a UI based application's lifetime. This access reduction in turn reduces the number of system calls across the VM/native boundary 147 between the virtual code portion 105 of the VM 101 and the native code portion 107 of each native OS 726 of computers 1 and 2 in FIG. 4. Limiting the amount of data contained in each system call across the VM/native boundary 147 acts to reduce the requisite data type marshaling overhead associated with such system calls compared to system parameter calls.

Figure 6:
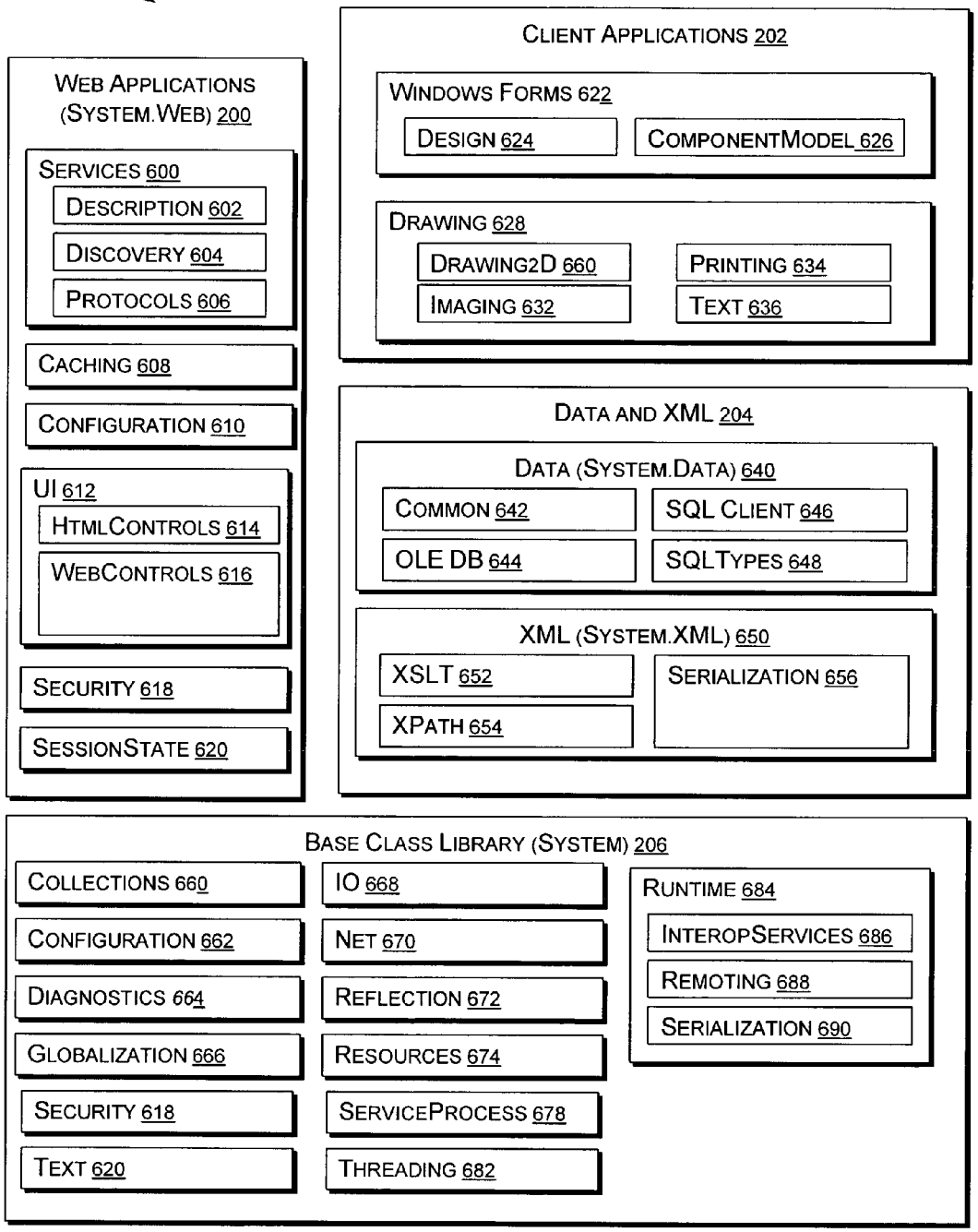
FIG. 6 is a block diagram of an implementation of the API of FIGS. 1-2, as well as function classes of the various API functions.

Implementations of method 500 can used by the API 142 and root namespaces 200-206 as shown in FIG. 2 and as shown in FIG. 6 in more detail. Root namespaces 200-206 of FIG. 6 are particularly applicable to the network environment 100 of FIG. 1 for the .NET™ platform computer software produced and distributed by Microsoft Corporation of Redmond, Wash., USA. Similarly, for resource constrained devices, all or a portion of root namespaces 200-206 of FIG. 6 can be used for the re-architected Compact Network Framework™ which is also provided by the Microsoft Corporation.

Web applications namespace 200 defines additional namespaces, including:

A services namespace 600 containing classes that enable a developer to build and use Web services. The services namespace 600 defines additional namespaces, including a description namespace 602 containing classes that enable a developer to publicly describe a Web service via a service description language, a discovery namespace 604 containing classes that allow Web service consumers to locate available Web Services on a Web server, and a protocols namespace 606 containing classes that define the protocols used to transmit data across a network during communication between Web service clients and the Web service itself.

A caching namespace 608 containing classes that enable developers to decrease Web application response time through temporarily caching frequently used resources on the server.

A configuration namespace 610 containing classes that are used to read configuration data in for an application.

A UI namespace 612 containing types that allow developers to create controls and pages that will appear in Web applications as user interfaces on a Web page. Within the UI namespace 612 are two additional namespaces: an HTML controls namespace 614 containing classes that permit developers to interact with types that encapsulates html 3.2 elements to create HTML controls, and a Web controls namespace 616 containing classes that allow developers to create higher level Web controls.

A security namespace 618 containing classes used to implement security in web server applications, such as basic authentication, challenge response authentication, and role based authentication.

A session state namespace 620 containing classes used to access session state values (i.e., data that lives across requests for the lifetime of the session) as well as session-level settings and lifetime management methods.

The client applications namespace 202 is composed of two namespaces:

A windows forms namespace 622 containing classes for creating Windows®based client applications with user interface features available in the Microsoft Windows® operating system, such as the ability to drag and drop screen elements. Such classes may include wrapped APIs available in the Microsoft Windows® operating system that are used in a windowing UI environment. Within this namespace are a design namespace 624 that contains classes to extend design-time support for Windows forms and a component model namespace 626 that contains a windows form implementation. This namespace contains designer tools for developers at design time.

A drawing namespace 628 containing classes for graphics functionality. The drawing namespace 628 includes a 2D drawing namespace 630 that contains classes and enumerations to provide advanced 2-dimmensional and vector graphics functionality, an imaging namespace 632 that contains classes for advanced imaging functionality, a printing namespace 634 that contains classes to permit developers to customize printing, and a text namespace 636 that contains classes for advanced typography functionality.

The data and XML namespace 204 is composed of two namespaces:

A data namespace 640 containing classes for developers to build components to manage data from multiple data sources. The data namespace 640 includes a common namespace 642 that contains types shared by data providers. A data provider describes a collection of types used to access a data source, such as a database, in the managed space. The data namespace 640 also includes an OLE DB namespace 644 that contains types pertaining to data used in object-oriented databases (e.g., the SQL Server available from the Microsoft Corporation of Redmond, Wash., USA), and a SQL client namespace 646 that contains types pertaining to data used by SQL clients. The data namespace also includes a SQL types namespace 648 that contains classes for native data types within the SQL Server available from the Microsoft Corporation of Redmond, Wash., USA.

An XML namespace 650 containing classes that provide standards-based support for processing XML. The XML namespace 650 includes an XSLT namespace 652 that contains classes and enumerations to support XSLT (Extensible Stylesheet Language Transformations), an Xpath namespace 654 that contains an XPath parser and evaluation engine, and a serialization namespace 656 that contains classes used to serialize objects into XML format documents or streams.

The base class library namespace 206 includes the following namespaces:

A collections namespace 660 containing interfaces and classes that define various collections of objects, such as lists, queues, arrays, hash tables and dictionaries.

A configuration namespace 662 containing classes and interfaces that allow developers to programmatically access configuration settings and handle errors in configuration files.

A diagnostics namespace 664 containing classes that are used to debug applications and to trace code execution. The namespace allows developers to start system processes, read and write to event logs, and monitor system performance using performance counters.

A globalization namespace 666 containing classes that define culture-related information, including the language, the country/region, the calendars in use, the format patterns for dates, currency and numbers, and the sort order for strings.

An I/O namespace 668 containing the infrastructure pieces to operate with the input/output of data streams, files, and directories. This namespace includes a model for working with streams of bytes, higher level readers and writers which consume those bytes, various constructions or implementations of the streams (e.g., FileStream and MemoryStream) and, a set of utility classes for working with files and directories.

A net namespace 670 providing a set of classes for building network-enabled application having libraries that include three layers. The three layers are a base layer that provides access to an interface to TCP/IP, a Transport Protocol classes layer, and a Web request layer that provides an abstract factory pattern for the creation of other protocol classes.

A reflection namespace 672 containing types that provide a managed view of loaded types, methods, and fields, with the ability to dynamically create and invoke types.

A resources namespace 674 containing classes and interfaces that allow developers to create, store and manage various culture-specific resources used in an application.

A security namespace 676 supporting the underlying structure of the security system, including interfaces, attributes, exceptions, and base classes for permissions.

A service process namespace 678 containing classes that allow developers to install and run services. Services are long-running executables that run without a user interface. They can be installed to run under a system account that enables them to be started at computer reboot. Services whose implementation is derived from processing in one class can define specific behavior for start, stop, pause, and continue commands, as well as behavior to take when the system shuts down.

A text namespace 680 containing classes representing various types of encodings (e.g., ASCII, Unicode, UTF-7, and UTF-8), abstract base classes for converting blocks of characters to and from blocks of bytes, and a helper class that manipulates and formats string objects without creating intermediate instances.

A threading namespace 682 containing classes and interfaces that enable multi-threaded programming. This namespace also provides classes for thread scheduling, wait notification, and deadlock resolution.

A runtime namespace 684 containing multiple namespaces concerning runtime features, including an interoperation services namespace 686 that contains a collection of classes useful for accessing COM objects. The runtime namespace 684 further includes a remoting namespace 688 that contains classes and interfaces allowing developers to create and configure distributed applications. Another namespace within the runtime namespace 684 is a serialization namespace 690 that contains classes used for serializing and deserializing objects. Serialization is the process of converting an object or a graph of objects into a linear sequence of bytes for either storage or transmission to another location.

Exemplary Computer Environment

FIG. 7 illustrates an example of a suitable computing environment 700 within which the programming framework 132 may be implemented (either fully or partially). Computing environment 700 is particularly useful for implementing the AL 145 in framework 132, as well as for framework 150, so as to have an assessment function that batches, synthesizes, and/or filters out notifications (e.g. events and/or messaging based upon predetermined criteria prior to passing calls for UI resources) across the boundary between managed and native code. The frameworks 132, 150 may be implemented with numerous other general purpose or special purpose computing system environments or configurations. Examples of well known computing systems, environments, and/or configurations that may be suitable for use include, but are not limited to, personal computers, server computers, multiprocessor systems, microprocessor-based systems, network PCs, minicomputers, mainframe computers, distributed computing environments that include any of the above systems or devices, and so on.

The computing environment 700 may be utilized in the computer and network architectures described herein. The exemplary computing environment 700 is only one example of a computing environment and is not intended to suggest any limitation as to the scope of use or functionality of the computer and network architectures. Neither should the computing environment 700 be interpreted as having any dependency or requirement relating to any one or combination of components illustrated in the exemplary computing environment 700.

The computing environment 700 includes a general-purpose computing device in the form of a computer 702. The components of computer 702 can include, by are not limited to, one or more processors or processing units 704, a system memory 706, and a system bus 708 that couples various system components including the processor 704 to the system memory 706.

The system bus 708 represents one or more of several possible types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 702 typically includes a variety of computer readable media. Such media can be any available media that is accessible by computer 702 and includes both volatile and non-volatile media, removable and non-removable media.

The system memory 706 includes computer readable media in the form of volatile memory, such as random access memory (RAM) 710, and/or non-volatile memory, such as read only memory (ROM) 712. A basic input/output system (BIOS) 714, containing the basic routines that help to transfer information between elements within computer 702, such as during start-up, is stored in ROM 712. RAM 710 typically contains data and/or program modules that are immediately accessible to and/or presently operated on by the processing unit 704.

Computer 702 may also include other removable/non-removable, volatile/non-volatile computer storage media. By way of example, FIG. 7 illustrates a hard disk drive 716 for reading from and writing to a non-removable, non-volatile magnetic media (not shown), a magnetic disk drive 718 for reading from and writing to a removable, non-volatile magnetic disk 720 (e.g., a "floppy disk"), and an optical disk drive 722 for reading from and/or writing to a removable, non-volatile optical disk 724 such as a CD-ROM, DVD-ROM, or other optical media. The hard disk drive 716, magnetic disk drive 718, and optical disk drive 722 are each connected to the system bus 708 by one or more data media interfaces 726. Alternatively, the hard disk drive 716, magnetic disk drive 718, and optical disk drive 722 can be connected to the system bus 708 by one or more interfaces (not shown).

The disk drives and their associated computer-readable media provide non-volatile storage of computer readable instructions, data structures, program modules, and other data for computer 702. Although the example illustrates a hard disk 716, a removable magnetic disk 720, and a removable optical disk 724, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 716, magnetic disk 720, optical disk 724, ROM 712, and/or RAM 710, including by way of example, an operating system 726, one or more application programs 728, other program modules 730, and program data 732. Each of the operating system 726, one or more application programs 728, other program modules 730, and program data 732 (or some combination thereof) may include elements of the programming framework 132.

A user can enter commands and information into computer 502 via input devices such as a keyboard 734 and a pointing device 736 (e.g., a "mouse"). Other input devices 738 (not shown specifically) may include a microphone, joystick, game pad, satellite dish, serial port, scanner, and/or the like.

These and other input devices are connected to the processing unit 704 via input/output interfaces 450 that are coupled to the system bus 708, but may be connected by other interface and bus structures, such as a parallel port, game port, or a universal serial bus (USB).

A monitor 742 or other type of display device can also be connected to the system bus 708 via an interface, such as a video adapter 744. In addition to the monitor 742, other output peripheral devices can include components such as speakers (not shown) and a printer 746 which can be connected to computer 702 via the input/output interfaces 740.

Computer 702 can operate in a networked environment using logical connections to one or more remote computers, such as a remote computing device 748. By way of example, the remote computing device 748 can be a personal computer, portable computer, a server, a router, a network computer, a peer device or other common network node, and so on. The remote computing device 748 is illustrated as a portable computer that can include many or all of the elements and features described herein relative to computer 702.

Logical connections between computer 702 and the remote computer 748 are depicted as a local area network (LAN) 750 and a general wide area network (WAN) 752. Such networking environments are commonplace in offices, enterprise-wide computer networks, intranets, and the Internet.

When implemented in a LAN networking environment, the computer 702 is connected to a local network 750 via a network interface or adapter 754. When implemented in a WAN networking environment, the computer 702 typically includes a modem 756 or other means for establishing communications over the wide network 752. The modem 756, which can be internal or external to computer 702, can be connected to the system bus 708 via the input/output interfaces 740 or other appropriate mechanisms. It is to be appreciated that the illustrated network connections are exemplary and that other means of establishing communication link(s) between the computers 702 and 748 can be employed.

In a networked environment, such as that illustrated with computing environment 700, program modules depicted relative to the computer 702, or portions thereof, may be stored in a remote memory storage device. By way of example, remote application programs 458 reside on a memory device of remote computer 748. For purposes of illustration, application programs and other executable program components such as the operating system are illustrated herein as discrete blocks, although it is recognized that such programs and components reside at various times in different storage components of the computing device 702, and are executed by the data processor(s) of the computer.

Implementations of the frameworks 132, 150, and particularly, the API 142 or calls made to the API 142, may be stored on or transmitted across some form of computer readable media. Alternatively, portions of the frameworks 132, 150 may be implemented in hardware or a combination of hardware, software, and/or firmware. For example, one or more application specific integrated circuits (ASICs) or programmable logic devices (PLDs) could be designed or programmed to implement one or more portions of the framework.

Computer readable media can be any available media that can be accessed by a computer. By way of example, and not limitation, computer readable media may comprise "computer storage media" and "communications media." "Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Conclusion

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method of facilitating efficient communication across a boundary between a managed code portion and a native code portion of a programming framework, the method comprising:

receiving, at an abstraction layer operating in the native code portion, a notification:
from a virtual machine operating the managed code portion before the notification being transitioned across the boundary to the native code portion; or
from an operating system operating in the native code portion before the notification being transitioned across the boundary to the managed code portion;
wherein:
the virtual machine, the abstract layer and the operating system are parts of the programming framework executed on a single computing device; and
the managed code portion in the programming framework is configured to target one or more platforms not supported in the native code portion of the programming framework; and assessing the notification at the abstraction layer as to whether the notification is to be immediately transitioned across the boundary based at least in part on a status of the virtual machine and status of system resources; and performing, at the abstraction layer, an action requiring less processing workload from the single computing device than the processing workload required to immediately transition the notification across the boundary, thereby alleviating strain of allocating resources on the single computing device in response to an immediate transition of the notification, the action being selected from the group consisting of:
combining the notification with one or more notifications previously received by the abstraction layer as a group before transitioning the group comprising the notification and the one or more notifications previously received across the boundary; and
discarding the notification.

2. The method as defined in claim 1, wherein the managed code portion receives the transition across the boundary from the native code portion.

3. The method as defined in claim 1, wherein the operating system receives a transition of the notification across the boundary from the managed code portion.

4. The method as defined in claim 1, wherein the notification is a call for a resource selected from a group consisting of a user interface (UI) resource and a non-UI resource.

5. The method as defined in claim 1, wherein the notification is an event or a message generated by a call for a UI resource.

6. A computer storage medium having computer instructions thereon that, where executed by a computer, perform the method of claim 1.

7. A method of facilitating communication across a boundary between a managed code portion and a native code portion in a computer environment, the managed code portion being operated by a virtual machine and having a base class library operable in the managed code portion, the native code portion comprising an operating system having a subsystem library operable in the native code portion, the method comprising:
   receiving, in an abstraction layer operating in a native code, a notification from the base class library before the notification being transitioned across the boundary to the subsystem library or from the subsystem library before the notification being transitioned across the boundary to the base class library, wherein:
      the managed code portion and the native code portion are parts of the environment executed on a single computing device;
      the managed code portion is configured to target one or more platforms not supported in the native code portion;
      the binary class library comprises a plurality of User Interface (UI) library within the managed code portion;
      the subsystem library in the operating system comprises a native windowing system responsible for creating, managing, and destroying a User Interface (UI) component in the native code; and
      the binary class library in the managed code portion and the subsystem library in the native code portion are configured to send and receive the notification across the boundary;
   assessing, at the abstraction layer, the notification as to whether the notification is to be immediately transitioned across the boundary between the managed code portion and the native code portion based at least in part on a status of the virtual machine and status of system resources; and
   performing, at the abstraction layer, an action requiring less processing workload from the single computing device than the processing workload required to immediately transition the notification across the boundary, thereby alleviating strain of allocating one or more User Interface (UI) resources on the single computing device in response to an immediate transition of the notification, the action comprising combining the notification with one or more notifications previously received by the abstraction layer into a group before transitioning the group comprising the notification and the one or more notifications previously received across the boundary.

8. The method as defined in claim 7, wherein the action further comprises discarding the notification.

9. The method as defined in claim 7, wherein the base class library receives the transition from the native code portion.

10. The method as defined in claim 7, wherein the subsystem library receives the transition from the managed code portion.

11. The method as defined in claim 7, wherein the notification is a call for a UI resource.

12. The method as defined in claim 7, wherein the notification is an event or message with respect to a UI resource.

13. A computer storage medium having computer instructions thereon that, where executed by a computer, perform the method of claim 7.

14. A method comprising:
   generating a plurality of notifications to be transitioned from a managed code portion across a boundary to a native code portion, the plurality of notifications selected from the group consisting of events and messaging by calls from the managed code portion for a User Interface (UI) resource in the native code portion, the management code portion and the native code portion being parts of a computer environment executed on a single computing device, wherein:
      the managed code portion is operated by a virtual machine and is configured to target one or more platforms not supported in the native code portion; and
      the native code portion of the computer environment comprises an operating system and an abstraction layer in a native code;
   passing the plurality of notifications generated by the managed code portion to the abstraction layer;
   evaluating the plurality of notifications at the abstraction layer to determine whether the plurality of notifications are to be immediately transitioned across the boundary based in part on a status of the virtual machine and status of system resources; and
   performing, at the abstraction layer, an action requiring less overall processing workload from the single computing device than processing workload accumulated to individually transition each of the plurality of notifications across the boundary, the action being selected from the group consisting of:
      batching or synthesizing the plurality of notifications with prior notifications received by the abstraction layer before transitioning the batched or synthesized plurality of notifications across the boundary; and
      discarding the plurality of notifications.

15. The method as defined in claim 14, wherein the calls for a UI resource generate the plurality of notifications by interaction with a UI using the UI resource.

16. The method as defined in claim 15, wherein the plurality of notifications manage the UI resource.

17. The method as defined in claim 14, wherein the UI is an input device.

18. The method as defined in claim 14, wherein:
   the UI is a touch sensitive menu screen; and
   the computer environment is included in a personal digital assistant.

19. A computer storage medium having computer instructions thereon that, where executed by a computer, perform the method of claim 14.

20. A method comprising:
   generating a plurality of notifications to be transitioned from a native code portion across a boundary to a managed code portion, the plurality of notifications selected from the group consisting of events and messaging by calls for a User Interface (UI) resource from a native code portion to a managed code portion, the native code portion and the managed code portion being parts of a computer environment executed on a single computing device, wherein:
  the managed code portion is operated by a virtual machine and is configured to target one or more platforms not supported in the native code portion; and
  the native code portion of the computer environment comprises an operating system and an abstraction layer in a native code;
passing the plurality of notifications generated by the native code portion to the abstraction layer;
evaluating the plurality of notifications at the abstraction layer to determine whether the plurality of notifications are to be immediately transitioned across the boundary from the native code portion to the managed code portion based at least in part on a status of the virtual machine and status of system resources; and
performing, at the abstraction layer, an action requiring less overall processing workload from the single computing device than processing workload accumulated to individually transition each of the plurality of notifications across the boundary, the action being selected from the group consisting of:
  batching or synthesizing the plurality of notifications with prior notifications received by the abstraction layer before transitioning the batched or synthesized plurality of notifications across the boundary; and
  discarding the plurality of notifications.

21. The method as defined in claim 20, wherein the plurality of notifications manage the UI resource.

22. The method as defined in claim 20, wherein the UI is an input device.

23. The method as defined in claim 20, wherein:
  the UI is a touch sensitive menu screen; and
  the computer environment is included in a personal digital assistant.

24. A computer storage medium having computer instructions thereon that, where executed by a computer, perform the method of claim 20.

25. A method comprising:
  interacting with a User Interface (UI) to generate a plurality of notifications calling a native UI resource of a computer environment comprising:
    a managed code portion being operated by a virtual machine and interfacing the UI; and
    the native code portion having the native UI resource and an abstract layer, wherein:
      the computer environment is executed on a single computing device;
      the native code portion comprises an operating system interfacing the abstract layer in a native code; and
      the plurality of notifications are selected from the group consisting of events and messaging and configured to pass from the managed code portion to the native code portion through a boundary;
  evaluating the plurality of notifications at the abstraction layer to determine whether the plurality of notifications are to be immediately transitioned across the boundary to the native portion based on a status of the virtual machine and status of system resources; and
  performing, at the abstraction layer, an action requiring less overall processing workload from the single computing device than processing workload accumulated to individually transition each of the plurality of notifications across the boundary, the action being selected from the group consisting of:
    synthesizing the plurality of notifications with prior notifications received by the abstraction layer; and
    disallowing the plurality of notifications from passing through the boundary to the operating system in the native code portion.

26. A computer storage medium having computer instructions thereon that, where executed by a computer, perform the method of claim 25.

27. An apparatus comprising:
  one or more processors;
  memory coupled with the one or more processors, the memory having thereon a plurality of instructions to implement a programming framework comprising:
    a managed code portion being operated by a virtual machine;
    a native code portion having an abstraction layer operating in a native code portion and an operating system interfacing the abstract layer;
    a boundary between the managed code portion and the native code portion;
    a program module for receiving a notification in the abstraction layer from the virtual machine in the managed code portion before the notification being transitioned across the boundary to the operating system or from the operating system in the native code portion before the notification being transitioned across the boundary to the virtual machine;
    a program module for assessing the notification at the abstraction layer as to whether the notification is to be immediately transitioned across the boundary between the managed code portion and the native code portion based in part on a status of the virtual machine and status of system resources; and
    a program module for performing, at the abstraction layer, an action requiring less processing workload from the one or more processors of the apparatus than the processing workload required to immediately transition the notification across the boundary, thereby alleviating strains of allocating resources in response to an immediate transition, the action being selected from the group consisting of:
      combining the notification with one or more notifications previously received by the abstraction layer into a group before transitioning the group comprising the notification and the one or more notifications previously received by the abstraction layer across the boundary; and
      discarding the notification.

28. The apparatus as defined in claim 27, wherein the managed code portion receives the transition across the boundary between the managed code portion and the native code portion.

29. The apparatus as defined in claim 27, wherein the operating system receives the transition across the boundary between the managed code portion and the native code portion.

30. The apparatus as defined in claim 27, wherein the notification is a call for a UI resource.

31. The apparatus as defined in claim 27, wherein the notification is an event or message with respect to a UI resource.

32. A computer device comprising:
  one or more processors;
  memory coupled with the one or more processors, the memory having thereon a plurality of instructions to implement a computer environment comprising:

a managed code portion being operated by a virtual machine, the virtual machine comprising:
an application; and
a base class library comprising a plurality of User Interface (UI) library within the managed code portion;
a native code portion having:
an abstraction layer operating in a native code; and
an operating system interfacing the abstract layer and having a subsystem library comprising a native windowing system responsible for creating, managing, and destroying a User Interface (UI) component in the native code;
a boundary between the managed code portion and the native code portion;
a program module for receiving a notification in the abstraction layer from the base class library in the managed code portion before the notification being transitioned across the boundary to the subsystem library in the native portion or from the subsystem library in the native code portion before the notification being transitioned across the boundary to the base class library, wherein the binary class library in the managed code portion and the subsystem library in the native code portion are configured to send and receive the notification across the boundary; and
a program module for:
assessing the notification at the abstraction layer as to whether the notification is to be immediately transitioned across the boundary between the managed code portion and the native code portion based on a status of the virtual machine and status of system resources; and
performing, at the abstraction layer, an action requiring less processing workload from the one or more processors of the computing device than the processing workload required to immediately transition the notification across the boundary, thereby alleviating strain of allocating resources in response to an immediate transition of the notification, the action being selected from the group consisting of:
combining the notification with one or more notifications previously received by the abstraction layer into a group before transitioning the group comprising the notification and the one or more notifications previously received by the abstraction layer across the boundary; and
discarding the notification.

33. The computer device as defined in claim 32, wherein the base class library receives the transition across the boundary between the managed code portion and the native code portion.

34. The computer device as defined in claim 32, wherein the subsystem library receives the transition across the boundary between the managed code portion and the native code portion.

35. The computer device as defined in claim 32, wherein the notification is a call for a UI resource.

36. The computer device as defined in claim 32, wherein the notification is an event or message with respect to a UI resource.

37. An apparatus comprising:
one or more processors;
a User Interface (UI) connected to the one or more processors;
memory coupled with the one or more processors and the UI, the memory having thereon a plurality of instructions to implement a computer environment comprising:
a native code portion having an abstraction layer in a native code and an operating system interfacing the abstract layer;
a managed code portion being operated by a virtual machine;
a boundary between the managed code portion and the native code portion;
a program module for interacting with the UI and generating events or messaging by calls for a UI resource in the native code portion from the managed code portion;
a program module for passing, through the abstract layer, the events or messaging from the managed code portion to the native code portion;
a program module for:
evaluating the events or messaging at the abstraction layer to determine whether the events or messaging are to be immediately transitioned across the boundary to the native code portion based at least in part on a status of the virtual machine and status of system resources; and
performing, at the abstraction layer, an action requiring less processing workload from the one or more processors of the apparatus than the processing workload required to immediately transition the events or messaging across the boundary, the action being selected from the group consisting of:
batching or synthesizing the events or messaging with prior events or messaging received by the abstraction layer before transitioning the batched or synthesized events or messaging across the boundary to the native code portion; and
discarding the events or messaging.

38. The apparatus as defined in claim 37, wherein the interaction with the UI using the UI resource causes the program module for generating to generate the events or messaging.

39. The apparatus as defined in claim 38, wherein the events or messaging manage the UI resource.

40. The apparatus as defined in claim 37, wherein the UI is an input device.

41. The apparatus as defined in claim 37, wherein:
the UI is a touch sensitive menu screen; and
the computer environment is included in a personal digital assistant.

42. A computer comprising:
one or more processors;
memory coupled with the one or more processors, the memory having thereon a plurality of instructions to implement a computer environment comprising:
a native code portion having an abstraction layer in a native code and an operating system interfacing the abstraction layer;
a managed code portion being operated by a virtual machine;
a boundary between the managed code portion and the native code portion;
a program module for generating events by calls for a User Interface (UI) resource in the managed code portion from the native code portion;
a program module for passing, through the abstract layer, the events across the boundary from the native code portion to the managed code portion; and a program module for:
evaluating the events to determine whether the events are to be immediately passed to the managed code portion based on a status of the virtual machine and status of system resources; and
performing an action requiring less processing workload from the one or more processors of the computer than the processing workload required to immediately pass the events across the boundary, the action being selected from the group consisting of:
synthesizing the events with prior events received by the abstraction layer before transitioning the synthesized events across the boundary to the managed code portion; and
discarding the events.

43. The computer as defined in claim 42, wherein the events or messaging manage the UI resource.

44. The computer as defined in claim 42, wherein the UI is an input device.

45. The computer as defined in claim 42, wherein:
the UI is a touch sensitive menu screen; and
the computer environment is included in a personal digital assistant.

46. An apparatus comprising:
one or more processors;
a User Interface (UI) coupled to the one or more processors;
memory coupled with the one or more processors and the UI, the memory having thereon a plurality of instructions to implement a computer environment comprising:
a native code portion having an abstraction layer and an operating system;
a managed code portion interfacing the UI, the managed code portion being operated by a virtual machine;
a program module for interacting with the UI using a UI resource to generate events or messaging by calls for the UI resource in the native code portion;
a program module for passing, through the abstract layer, the generated events or messaging from the managed code portion to the native code portion;
a program module for:
evaluating the events or messaging at the abstraction layer in the native code portion to determine whether the events or messaging are to be immediately passed to the native code portion based at least in part on a status of the virtual machine and status of system resources; and
performing an action requiring less processing workload from the one or more processors of the computer than the processing workload required to immediately pass the events across the boundary, the action being selected from the group consisting of:
synthesizing the events with prior events received by the abstraction layer before transitioning the synthesized events across the boundary to the managed code portion; and
discarding the events: and
disallowing the events or messaging from passing through to the operating system.

47. A computer storage medium having computer executable instructions that, when executed on one or more processors of a single computing device having a native code portion and a managed code portion, cause the one or more processors to perform steps comprising:
generating a native message in a native windowing system in the native code portion;
passing, to the managed code portion, the native message with a message pump through an abstraction layer executing native code in the native code portion, wherein the native code portion and the managed code portion are parts of a computer environment executed on the single computing device;
processing the native message at the abstraction layer to determine whether the native message is to immediately pass the abstraction layer to the managed code portion based at least in part on a status of a virtual machine operating the managed code portion and status of system resources; and
initiating, at the abstraction layer, an action requiring less processing workload from the one or more processors of the single computing device than the processing workload required for the native message to immediately pass the abstraction layer to the managed code portion, the action being selected from the group consisting of:
combining the native message with one or more native messages previously received by the abstraction layer before passing a combination of the native message and the one or more native messages previously received to the managed code portion; and
discarding the native message;
thereby alleviating strain of allocating resources on the single computing device in response to an immediate pass of the native message.

48. The computer storage medium as defined in claim 47, wherein the computer executable instructions for performing steps further comprise:
translating the native message received in the managed code portion for processing by the managed code portion;
routing the translated native message to one of:
a managed drawing library; and
a managed windowing library;
routing the translated native message to a managed application in the managed code portion from as received from one of:
the managed drawing library; and
the managed windowing library;
processing the translated native message with the managed application.

49. A computer storage medium having computer executable instructions that, when performed by one or more processors of a single computing device having a managed code portion and a native code portion, cause the one or more processors to perform a method comprising:
generating a managed message in a managed application executing in the managed code portion;
passing the managed message from the managed application to a managed library in the managed code portion;
passing the managed message from the managed library to an abstraction layer executing native code in the native code portion, wherein the native code portion and the managed code portion are parts of a computer environment executed on the single computing device;
processing the managed message at the abstraction layer to determine whether the managed message is to immediately pass the abstraction layer to the native code portion based at least in part on a status of a virtual machine operating the managed code portion and status of system resources; and
performing, at the abstraction layer, an action requiring less processing workload from the one or more processors of the single computing device than the processing workload required for the managed message to immediately pass the abstraction layer to the native code portion, the action being selected from the group consisting of:

combining the managed message with one or more managed messages previously received by the abstraction layer as generated by the managed application or by the managed library before passing a combination of the managed message and the one or more managed message previously received across the abstraction layer to the native code portion; and discarding the managed message thereby alleviating strain of allocating resources on the single computing device in response to an immediate pass of the managed message.

50. The computer storage medium as defined in claim 49, wherein the computer executable instructions for performing steps further comprise:

translating the managed message received in the native code portion for processing by the native code portion;

routing the translated managed message with a message pump to a native windowing system in the native code portion; and processing the translated managed message with the native windowing system.

51. The computer storage medium as defined in claim 49, wherein the managed library is selected from a group consisting of a managed drawing library and a managed windowing library.

* * * * *